US011288815B2

(12) United States Patent
Qiu et al.

(10) Patent No.: US 11,288,815 B2
(45) Date of Patent: Mar. 29, 2022

(54) SYSTEMS AND METHODS FOR TRACKING SINGLE-CELL MOVEMENT TRAJECTORIES

(71) Applicant: Georgia Tech Research Corporation, Atlanta, GA (US)

(72) Inventors: Peng Qiu, Atlanta, GA (US); Todd Sulchek, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 158 days.

(21) Appl. No.: 16/734,749

(22) Filed: Jan. 6, 2020

(65) Prior Publication Data
US 2020/0219266 A1 Jul. 9, 2020

Related U.S. Application Data

(60) Provisional application No. 62/788,393, filed on Jan. 4, 2019.

(51) Int. Cl.
*G06T 7/20* (2017.01)
*G06K 9/00* (2022.01)

(52) U.S. Cl.
CPC .......... *G06T 7/20* (2013.01); *G06K 9/00134* (2013.01); *G06K 9/00711* (2013.01); *G06K 2009/00738* (2013.01); *G06T 2207/30241* (2013.01)

(58) Field of Classification Search
CPC .......... G06T 7/20; G06T 2207/30241; G06K 9/00134; G06K 9/00711; G06K 2009/00738
See application file for complete search history.

(56) References Cited

U.S. PATENT DOCUMENTS

| 6,757,423 B1* | 6/2004 | Amini | G06T 7/246 382/128 |
| 6,969,843 B1* | 11/2005 | Beach | G01J 1/32 250/205 |
| 7,831,088 B2* | 11/2010 | Frakes | H04N 19/51 382/154 |
| 2017/0059471 A1* | 3/2017 | Wachemig | G02B 21/365 |
| 2018/0038784 A1* | 2/2018 | Marks | G01N 15/1425 |

OTHER PUBLICATIONS

Armbrecht, Lucas, and Petra S Dittrich. "Recent Advances in the Analysis of Single Cells."Analytical chemistry vol. 89, 1 (2017): 2-21. doi:10.1021/acs.analchem.6b04255 (Year: 2017).*
Kimmerling, R., Lee Szeto, G., Li, J. et al. A microfluidic platform enabling single-cell RNA-seq of multigenerational lineages. Nat Commun 7, 10220 (2016). https://doi.org/10.1038/ncomms10220 (Year: 2016).*

* cited by examiner

*Primary Examiner* — Shefali D Goradia
(74) *Attorney, Agent, or Firm* — Troutman Pepper Hamilton Sanders LLP; Ryan A Schneider

(57) ABSTRACT

A system for tracking single-cell movement trajectories is disclosed. The system can record, to a plurality of frames, cells (events) within a microfluidic device. Also, the system can identify an event within each frame including whether the event is a single cell or multiple cells. When the event appears differently between frames (e.g., single cell in one frame and multiple cells in another frame), the system can either segment or merge the cell(s). Then, the system can determine a trajectory for the events based on a position of the event in the frames. Further, the system can determine cell properties based on the trajectory of the events.

17 Claims, 4 Drawing Sheets

SYSTEMS AND METHODS FOR TRACKING SINGLE-CELL MOVEMENT TRAJECTORIES

CROSS-REFERENCE TO RELATED APPLICATIONS

This application claims the benefit, under 35 U.S.C. § 119(e), of U.S. Provisional Patent Application No. 62/788,393, filed 4 Jan. 2019, the entire contents and substance of which are incorporated herein by reference in their entirety as if fully set forth below.

STATEMENT REGARDING GOVERNMENT SUPPORT

This invention was made with government support under Grant No. 1552784 awarded by the National Science Foundation. The government has certain rights in the invention.

FIELD OF INVENTION

This application is generally related to tracking and sorting cells according to biochemical properties, and, more particularly, to systems and methods for accurately tracking and sorting single-cell movement trajectories in microfluidic cell sorting devices.

BACKGROUND

Microfluidics can be used for biological inquiries at the single-cell level, such as single-cell gene expression for lineage analysis and signaling dynamics and cell sorting. One application of microfluidics can be the study of single-cell biomechanical characteristics, such as elasticity, viscosity, stiffness and/or adhesion. Utilizing a microfluidic channel having ridges that are diagonal with respect to the flow direction, cells can be compressed and translated when passing through the channel, and exhibit different trajectories depending on their biomechanical properties. The trajectories can also be affected by the channel design at least based on the ridge height, angle, and/or spacing. The microfluidic approach for studying cellular biomechanics can be highly cost effective compared to atomic force microscopy, and can have high throughput similar to flow cytometry. Ridged microfluidic channels can separate cells at least based on stiffness, size, adhesion, viability, and/or viscoelasticity.

The trajectories can contain rich information pertaining to the interactions between the cells and the ridged channel, providing an opportunity for quantifying cell biomechanical properties, as well as optimizing the channel design for various sorting applications. By mounting the microfluidic chip on an inverted microscope and a high-speed camera, cells can be recorded when passing through the channel, and the trajectories can be computationally extracted from the recordings.

Extracting trajectories from the recordings can appear to be a simple problem; however, it can still be challenging to automatically extract the trajectories with high accuracy. One such challenge arises when one cell collides with another, and the two cells stick together for a while before detaching from each other. This collision and detachment of cells can be challenging to accurately segment cells in each frame of a video recording, and thus, consecutive frames must be considered jointly. Another such challenge to accurate trajectory extraction arises when cells move too quickly through the microfluidic channel or when the contrast between the foreground and the background is low. Existing automated computational tools for cell tracking and particle tracking are incapable of automatically and accurately tracking the trajectories of cells in this application, due to either the collision and detachment, contrast patterns in the background, or cells with drastically varying speeds. Accordingly, a need exists for improved systems and methods for automatically extracting cell trajectories from video recordings of cells moving through ridged microfluidic channels.

SUMMARY

Aspects of the disclosed technology include systems and methods for tracking single-cell movement trajectories. Consistent with the disclosed embodiments, the methods can include one or more processors, cameras, microfluidic devices, or databases. One exemplary method can include recording a plurality of events (e.g., a single cell, multiple cells, debris, or noise) to a plurality of frames within a ridged microfluidic channel over a predetermined amount of time. The method can also identify the plurality of events, which can comprise at least one first event, at least one second event, and at least one third event within a first frame, a second frame, and a third frame, respectively. The plurality of events can be distinguished from the background based on each of the plurality of events being beyond a predetermined range of a background baseline illumination. For each of the plurality of events, the method can determine a center including an x-coordinate and a y-coordinate, a number of pixels, and a radius. Also, the method can determine a cell type (e.g., a single cell or an aggregate of multiple cells) for each of the plurality of events. Then, the plurality of events can be compared to one another to determine whether a match exists. When each of the plurality of events match one another and are a single cell, the method can include determining a trajectory of the plurality of events based on the center of each event within the first frame, the second frame, and the third frame.

Alternately or additionally, when the method determines that the at least one first event of the first frame is an aggregate of multiple cells, the method can segment the at least one event of the first frame. This can be accomplished by: identifying a plurality of single cells of the at least one first event of the first frame; comparing the plurality of single cells to the at least one event of the second frame to determine a partial match; and mapping each of the plurality of single cells to the at least one second event. Mapping can include calculating an average frame time by dividing the predetermined amount of time by a number of the plurality events and then determining a probable travel region (an estimate of a location of the at least one second event) for the at least one first event based on the average frame time, and the center, the number of pixels and/or the radius of the at least one first event. Then, the method can determine a trajectory of the plurality of events based at least in part on the center of each event within the first frame and the second frame.

Alternately or additionally, when the method determines that the at least one first event of the first frame is a single cell type and that the at least one second event of the second frame is an aggregate of multiple cells, the method can merge the at least one event of the first frame and the least one event of the second frame. Merging can be performed by: identifying a plurality of single cells from the at least one second event; comparing each of the plurality of single cells to the at least one first event to determine a partial match; and mapping each of the plurality of single cells to the at least one first event. Mapping can further include: calculating an average frame time by dividing the predetermined amount of time by a number of the plurality events; and determining a probable travel region for the at least one first event based on the average frame time, and the center, the number of pixels and/or the radius of the at least one first event. Then, the method can determine a trajectory of the plurality of events based at least in part on the center of each event within the first frame and the second frame.

In some examples, the method can further involve comparing the trajectory of the plurality of events to previous trajectories to identify a most closely matching trajectory of the previous trajectories. Also, each of the previous trajectories can comprise previous cell properties. The method can then determine cell properties for the plurality of events based on the previous cell properties of the most closely matching trajectory.

According to some examples, the method can include displaying, by a graphical user interface, the trajectory of the plurality of events.

In some examples, wherein determining the trajectory of the plurality of events can be further based on the center of the at least one third event within the third frame.

In some examples, identifying the plurality of events can further include: determining the amount of illumination of each of the plurality of frames; determining a background baseline illumination for each of the frames based on an average background baseline illumination of a predetermined number of nearby frames; determining an overall frame illumination for each of the frames; and comparing the background baseline illumination for each of the frames to the respective overall frame illumination to determine that the at least one event is beyond a predetermined range of the background baseline illumination.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into and constitute a portion of this disclosure, illustrate various implementations and aspects of the disclosed technology, and, together with the description, serve to explain the principles of the disclosed technology. In the drawings.

DETAILED DESCRIPTION

Some implementations of the disclosed technology will be described more fully with reference to the accompanying drawings. This disclosed technology can be embodied in many different forms, however, and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

It is also to be understood that the mention of one or more method steps does not imply that the methods steps must be performed in a particular order or preclude the presence of additional method steps or intervening method steps between the steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
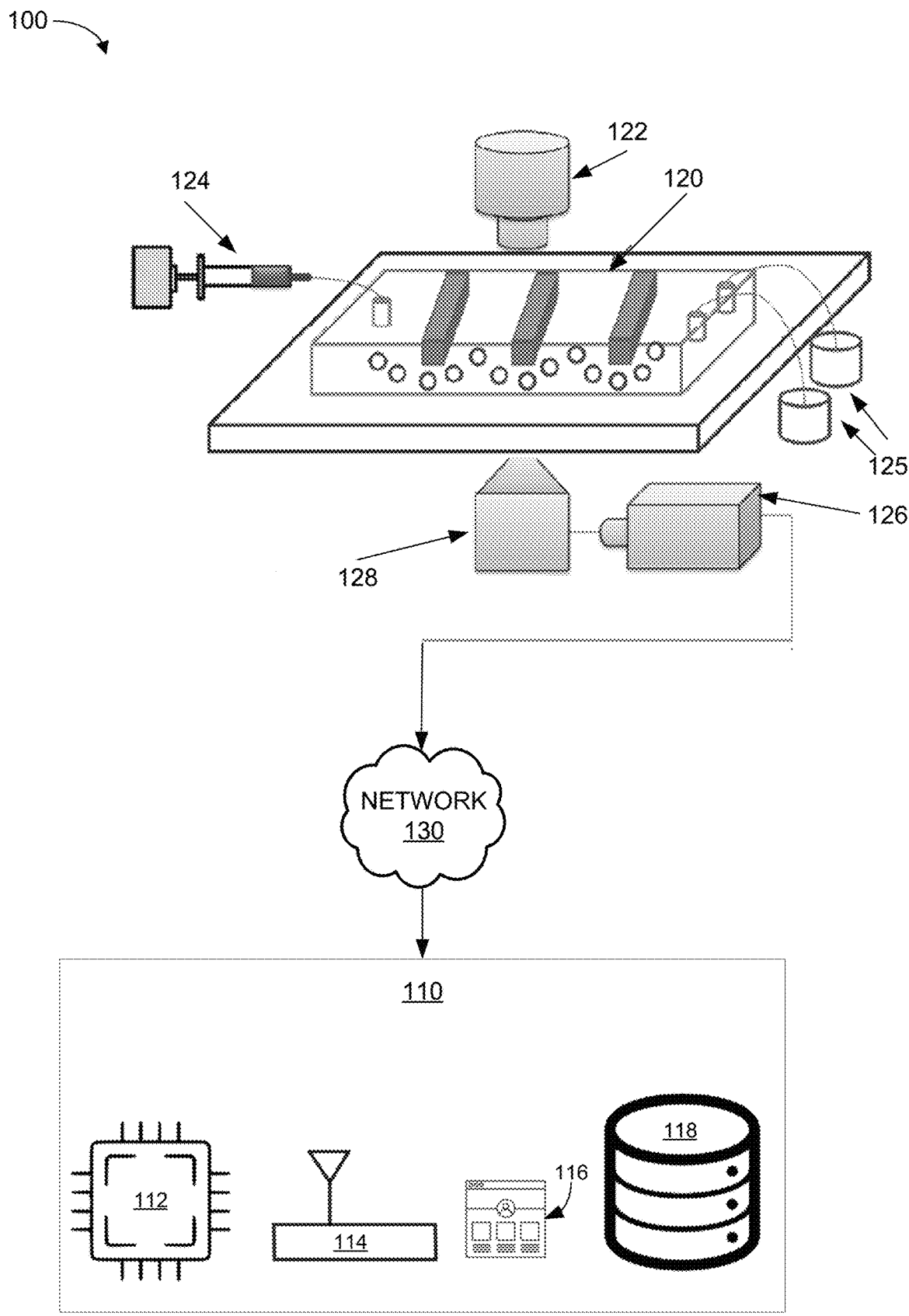
FIG. 1 is a diagram of an example system for tracking single-cell movement trajectories, in accordance with some examples of the present disclosure.

FIG. 1 shows an example system 100 that can implement certain methods for tracking single-cell movement trajectories. As shown in FIG. 1, in some implementations the system 100 can include computing device 110, which can include one or more processors 112, transceiver 114, graphical user interface (GUI) 116, and database 118, among other things. The system 100 can further include microfluidic device 120, light source 122, syringe pump 124, outlets 125, camera 126 (e.g., a high-speed camera), and objective lens 128. The computing device 110 may belong to a research laboratory or another institution involved in, for example, studying cell properties. The system 100 can also include network 130 that can include a network of interconnected computing devices such as, for example, an intranet, a cellular network, or the Internet.

The microfluidic device 120 can include a ridged microfluidic channel in which a plurality of cells can be inserted via the syringe pump 124. The design of the ridged microfluidic channel which can vary based on ridge height, angle, and/or spacing and can be used to separate cells based on stiffness, size, adhesion, viability, and/or viscoelasticity. Cells of varying types (e.g., treated cells, untreated cells) can be recorded by camera 126, using illumination provided by the light source 122, as the cells traverse the microfluidic device 120. Further, the recordings (e.g., plurality of frames of a video file) can be magnified by the objective lens 128, which can provide as much as 20× magnification. The camera 126 can be a high-speed camera that operates at a minimum of 800 frames per second with a minimum resolution of 640 by 480 pixels. After traversing through ridges of the microfluidic device 120, cells can exit the microfluidic device 120 via the outlets 125.

Once the plurality of cells has been recorded, the computing device 110 can determine a trajectory of single cells, which can contain information pertaining to the interactions between the cells and the ridged microfluidic channel. Thus, cell biomechanical properties can be quantified and the channel design (ridge microfluidic channel) can be optimized.

To begin, the computing device 110 can receive the plurality of frames (e.g., video file) from the camera 126 via the transceiver 114. Next, the computing device 110 can identify at least one event (e.g., single cells, an aggregate of multiple cells, debris, and/or noise) within each frame.

Because the background of each frame is relatively constant without any rotation, translation or deformation, and generally has a baseline intensity that varies due to slight changes in the illumination, the background of each frame can be estimated by the average of nearby frames. As an example, the one or more processors 112 can determine an amount of illumination of each of the plurality of frames, a background baseline illumination for each of the plurality of frames based on an average background baseline illumination of a predetermined number of nearby frames, and an overall frame illumination for each of the plurality of frames. Then, the one or more processors 112 can compare the background baseline illumination for each of the plurality frames to the respective overall frame illumination to determine that the at least one event is beyond a predetermined range of the background baseline illumination, i.e., distinguishing the foreground objects (e.g., cells) from the background. Thus, a plurality of events (at least one event for each frame) can be identified, which can include a center including an x-coordinate and a y-coordinate, a number of pixels, a radius, and/or pixel intensity.

The one or more processors 112 can further identify the cell type (e.g., single cell or an aggregate of multiple cells) based at least in part on the cell radius and/or the number of pixels of the at least one event. Next, the one or more processors 112 can compare each of the plurality of events to determine whether a match exists. Determining a match can be based on comparing the numbers of pixels of each event of a current frame to identified events of a subsequent frame. Each compared event can be scored based on how closely the number of pixels match. Scoring can also include decrementing the value of an event based on changes of the number of pixels between different frames (e.g., between the current frame and the subsequent frame), distance of movement the event from one frame to the next frame, and differences in pixel intensity of the event. Events can be compared in a forward matching manner, i.e., current frame having an identification of p being compared to a subsequent frame having an identification of value p+1. Also, the events can be compared in a backward matching manner, comparing the current event having an identification of p to a previous event having an identification of p−1. Of course, the event having the highest score can be determined to be a match.

When each of the plurality of events match and are a single cell type, the one or more processors 112 can forego the process of merging and segmenting the events. In other words, a single cell is identified in each frame and studying its trajectory is based on the single cell's position within each consecutive frame. Thus, the one or more processors 112 can determine a trajectory of the plurality of events based on the center (position) of the event within each of the plurality of frames.

The events may need to be segmented when, for example, the event of the first frame is an aggregate of multiple cells. To accomplish this, the one or more processors 122 can identify a plurality of single cells of the second frame. Then, the one or more processors 122 can: calculate an average frame time by dividing the total amount of time of the video file by a number of the plurality frames; determining an average cell speed, which can be based on historic data of similar cells within a similar microfluidic device; and determine a probable travel region (an estimate of a location of the second event) for the first event based on a computation using the average cell speed, the average frame time, the center, the number of pixels, and/or the radius of the first event. Then, a trajectory of the plurality of events can be determined based at least in part on the center of each event within the first frame and the second frame.

The one or more processors 112 can also merge a single cell to an aggregate of multiple cells. This can occur when the one or more processors 112 determines that the first event is a single cell type, and that the second event is an aggregate of multiple cells. To do so, the one or more processors 112 can: calculate an average frame time; determine average cell speed; and determine a probable travel region for the first event based on the average frame time, the average cell speed, the center, the number of pixels, and/or the radius of the first event. Next, the one or more processors 112 can identify a plurality of single cells from the second event within the probable travel region, and then compare each of the plurality of single cells to the first event to determine a partial match. Next, the center of the first event can be mapped to the center of the second event, i.e., associating the second event's position with the center of the first event. Then, a trajectory of the plurality of events can be determined based at least in part on the center of each event within the first frame and the second frame. Of course, the determined trajectory of any of the examples mentioned above can be displayed by the GUI 116.

The computing device 110 can also determine cell properties of the identified events. The computing device 110 can retrieve from memory (e.g., database 118) previous trajectories of previously identified events that can be stored as historic data. In some examples, the computing device 110 can receive the historic data from a remote device or another database via transceiver 114. The one or more processors 112 can compare the trajectory of the plurality of events (e.g., current trajectory) to previous trajectories to identify a previous trajectory that most closely matches the current trajectory. Further, the previous trajectories data can comprise previous cell properties (e.g., elasticity, viscosity, stiffness, and/or adhesion). Therefore, the one or more processors 112 can predict cell properties for the plurality of events based on the previous cell properties of the most closely matching previous trajectory.

Figure 2:
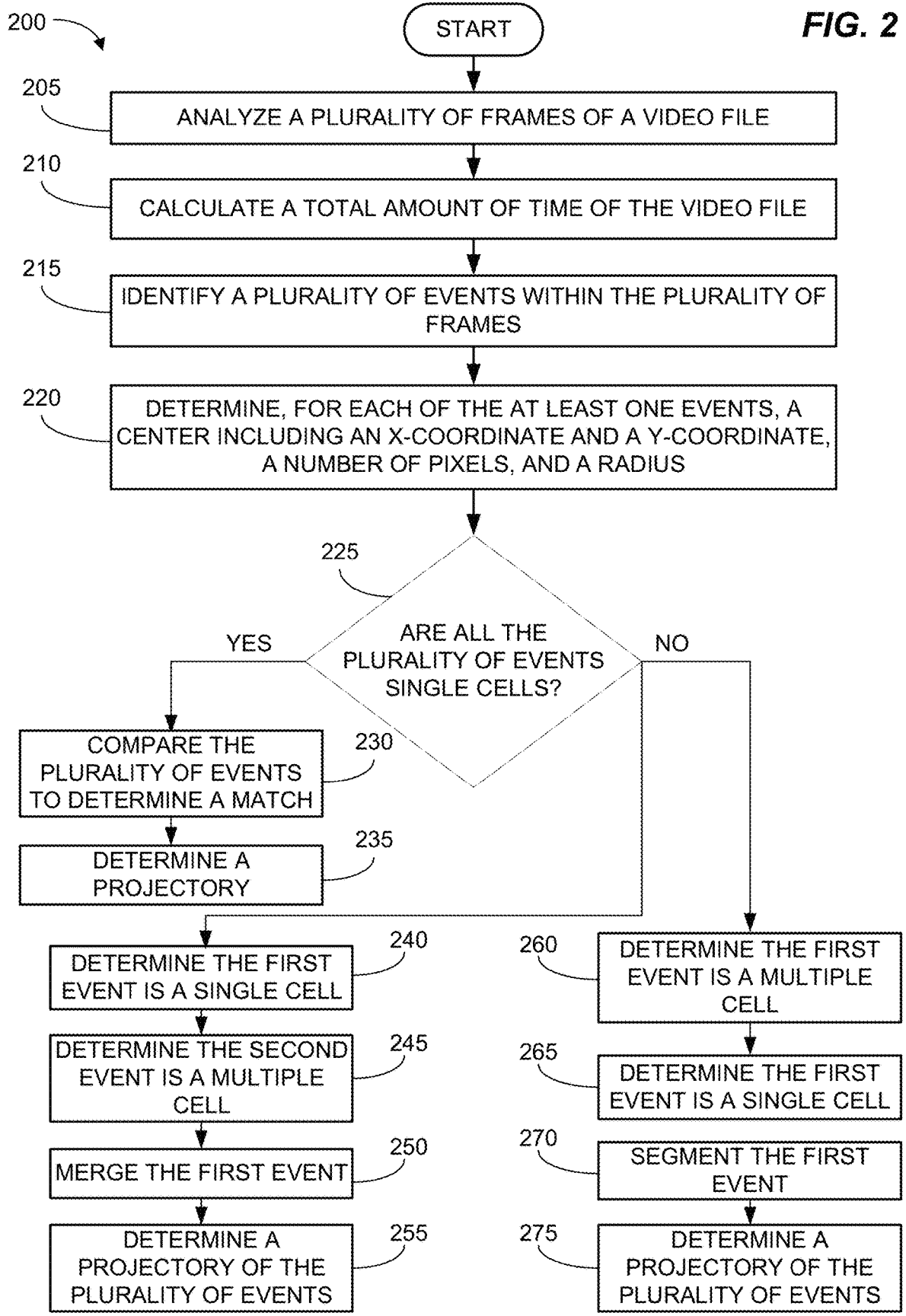
FIG. 2 is an example flow chart of a method for tracking single-cell movement trajectories, in accordance with some examples of the present disclosure.

FIG. 2 shows an example flow chart of a method for tracking single-cell movement trajectories. The method 200 is written from the perspective of the computing device 110, which can communicate with the camera 126 and/or the microfluidic device 120. The computing device 110 can analyze a video file, identify an event within each frame of the video file, and determine the trajectory of the event.

At 205, the computing device 110 can analyze a video file that includes a plurality of frames, where each of the frames include an amount of illumination. Then, at 210, the computing device 110 can calculate a total amount of time of the video file, which can be used in methods 300 and 400 to segment and merge the cells, respectively. At 215, the computing device 110 can identify a plurality of events (e.g., at least one for each of the plurality of frames). As mentioned above, identifying the plurality of events can involve distinguishing the background of each frame from the foreground objects. At 220, the method can determine a center including an x-coordinate and a y-coordinate, a number of pixels, and/or a radius for each of the events. Then, at 225, the method can identify the cell type of each of the plurality of events (e.g., single cells or multiple cells). At 230, after determining that each of the plurality of events are single cells, the computing device 110 can compare each of the plurality of events to one another to determine a match, i.e., that the event of the first frame is the same as the event of the second frame, etc. At 235, the computing device 110 can determine a trajectory of the plurality of events based on the center of the event of the first frame, and the center of the event of the second frame.

At 240, the computing device 110 can determine that the event of the first frame (e.g., first event) is a single cell, which can be based on the amount of pixels of the event. Similarly, the event of the second frame (e.g., second event) can be determined to be an aggregate of multiple cells, at 245. Then, at 250, the first event can be merged to the second event, i.e., mapping the position of the single-celled first event to the position of the multiple-celled second event, which is further described in reference to FIG. 3 below. At 255, a trajectory of the plurality of events can be determined based on the center (position) of each event within its respective frame.

At 260, the computing device 110 can determine that the event of the first frame is an aggregate of multiple cells and, at 265, the event of the second frame can be determined to be a single cell. Then, at 270, the first event can be segmented to the second event, i.e., mapping the position of the multiple-celled first event to the position of the single-celled second event, which is further described in reference to FIG. 4 below. At 275, a trajectory of the plurality of events can be determined based on the center (position) of each event within its respective frame.

Figure 3:
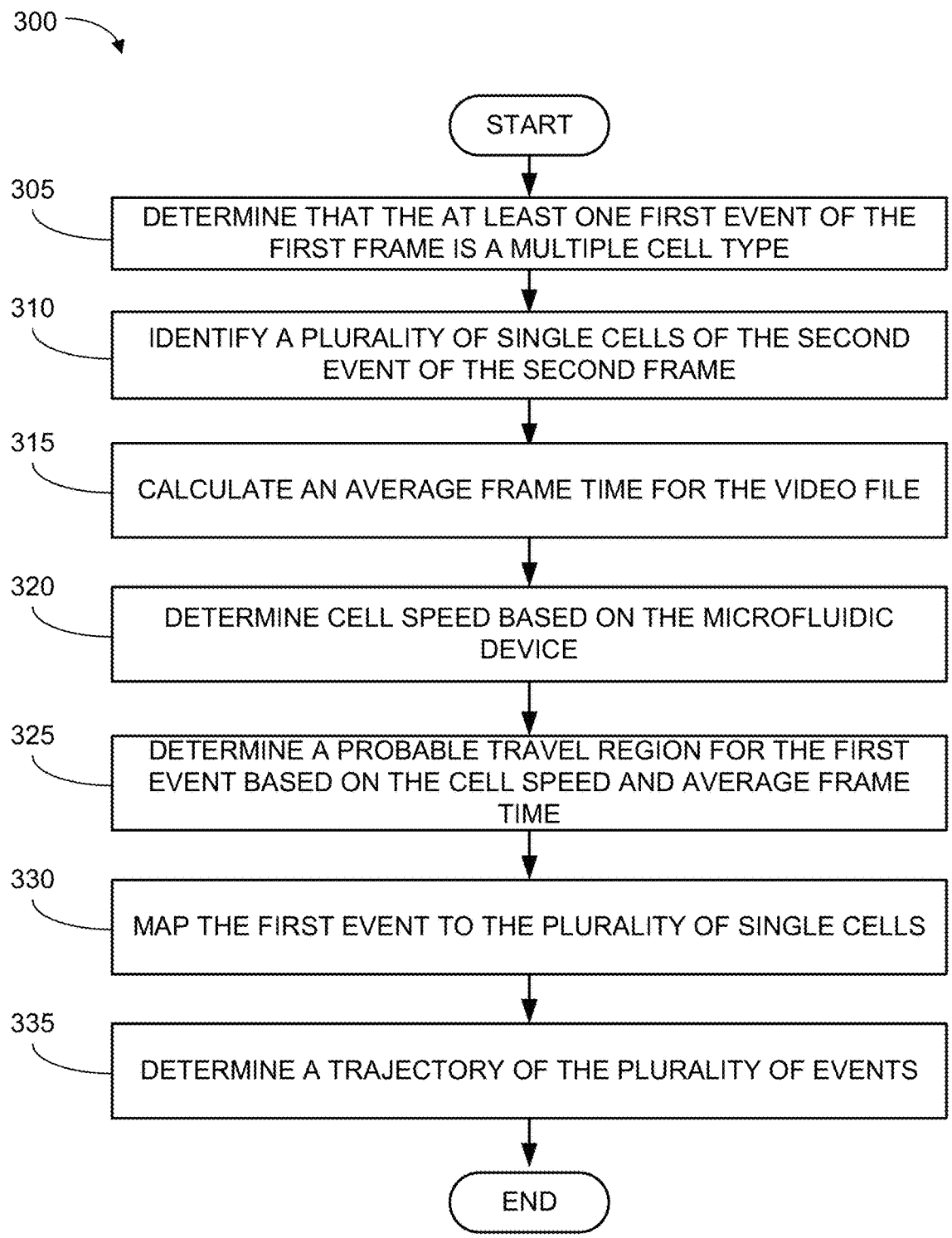
FIG. 3 is another example flow chart of a method of segmenting multiple cells to single cells to determine single-cell movement trajectories, in accordance with some examples of the present disclosure.

FIG. 3 is an example flow chart of a method of segmenting multiple cells to determine single-cell movement trajectories. The method 300 can be performed by the computing device 110 in communication with the camera 126, the microfluidic device 120, and/or the objective lens 128. The computing device 110 can identify an aggregate of cells (e.g., multiple cells) in one frame, identify a plurality of single cells comprising the aggregate of cells in the next frame, and then determine a trajectory of the single cells.

At 305, the method 300 can include determining that the first event of the first frame is an aggregate of multiple cells, which can be based on the cell size, i.e., the amount of pixels associated with the first event being beyond a predetermined cell size range. Therefore, events within the predetermined cell size range can be determined to be single cells and events beyond the predetermined cell size range can be determined to be aggregates of multiple cells. At 310, the computing device 110 can identify a plurality of single cells of a second event of the second frame. Then, at 315, the computing device 110 can calculate an average frame time of the video file, for example, by dividing the number of frames by the total video time. Further, at 320, the computing device 110 can determine an average cell speed based on the design of the microfluidic device 120. In some examples, determining the average cell speed can be based on retrieving historic data of previous cells, which can include the average cell speed of previous cells using a similar or same microfluidic device 120.

At 325, the computing device 110 can then determine a probable travel region for the first event based on the average cell speed and the average frame time. For example, for an average frame time of 0.1 second and an average cell speed of 0.05 mm/s, the probable travel region would be within 0.005 mm of the center (position) of the first event. Then, at 330, the method can include mapping the first event to the plurality of single cells, i.e., associating the center of each of the single cells with the center of the first event. At 335, the method can then determine a trajectory for the plurality of events (e.g., the first event and the second event) based on the center of the first event and the center of the second event.

Figure 4:
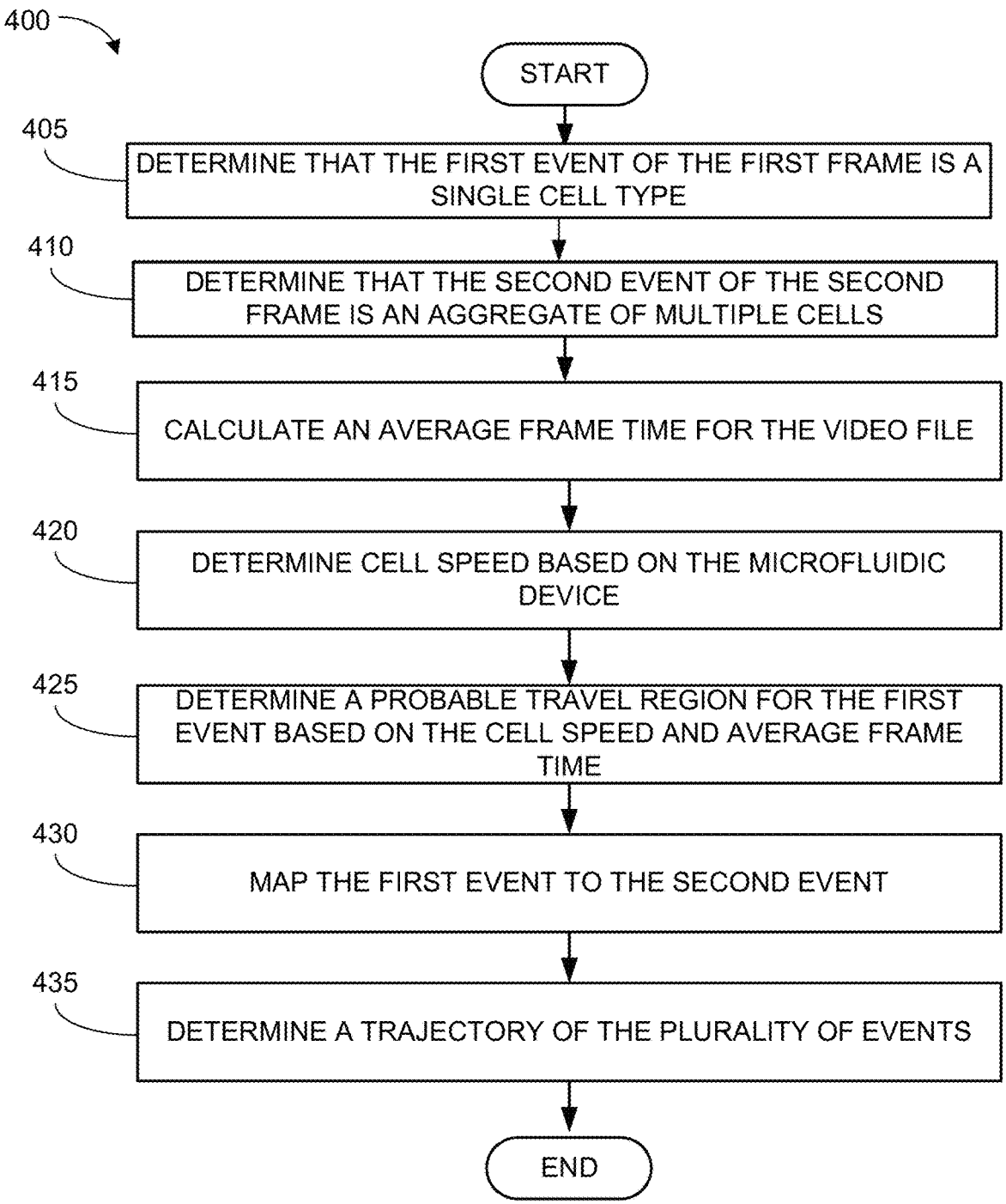
FIG. 4 is another example flow chart of a method of merging single cells to multiple cells to determine single-cell movement trajectories, in accordance with some examples of the present disclosure.

FIG. 4 is an example flow chart of a method of merging several single cells to an aggregate of multiple cells to determine single-cell movement trajectories. Similar to method 300, the method 400 can be performed by the computing device 110 in communication with the camera 126, the microfluidic device 120, and/or the objective lens 128. The computing device 110 can identify single cells of events in one frame, identify multiple cells (another event) in the next frame, and then determine a trajectory of the events.

At 405, the computing device 110 determine that the first event of the first frame is a single cell type, based on the cell size. Also, at 410, the computing device 110 can determine that the second event of the second frame is an aggregate of multiple cells (e.g., multiple cells), based on the cell size. Then, at 415, the computing device 110 can calculate an average frame time of the video file. Further, at 420, the computing device 110 can determine an average cell speed based on the design of the microfluidic device 120. At 425, the computing device 110 can then determine a probable travel region for the first event based on the average cell speed and the average frame time. Using the probable travel region, the computing device 110 can identify a single cell of the second event that matches the first event. In other words, the computing device 110 can identify a single cell in a first frame, then determine that the single cell appears as a multiple cell in a next frame. Thus, at 430, the computing device 110 can map the second event to the first event. Finally, at 435, the computing device 110 can determine a trajectory of the first event and the second event based on their position (e.g., center) within the respective frame.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for tracking cell movement trajectory comprising:
    analyzing, with a processor, a video file comprising a set of image frames, wherein each of the image frames comprises an amount of illumination;
    identifying, with the processor, one or more events in at least two consecutive image frames of the set of image frames, wherein each of the events has a type, being a single cell or an aggregate of multiple cells;
    determining, for each of the events, cell dimensions comprising a center including an x-coordinate and a y-coordinate, a number of pixels, and a radius;
    determining a matched event across at least two consecutive image frames of the set of image frames, where an event in a first image frame of consecutive image frames is matched with an event in a second image frame of the consecutive image frames, and wherein the determined match is based on the cell dimensions; and
    deriving a trajectory for the matched event, based on the x- and y-coordinates of the matched event that corresponds to the same cell in the consecutive image frames.

2. The method of claim 1 further comprising responsive to determining that the type of a first event of the first image frame is an aggregate of multiple cells, segmenting the first event by:
    calculating an average frame time by dividing a total amount of time of the video file by a number of the image frames in the set of image frames;
    determining an average cell speed based on historic data of cell speed;
    determining a probable travel region for the first event within the second image frame based on:
        the average frame time;
        the average cell speed; and
        the cell dimensions of the first event;
        wherein the probable travel region is an estimate of a location of the first event in the second image frame; and
    identifying single cells of the second image frame based on the probable travel region;
    wherein determining the matched event comprises matching the single cells in the second image frame to the first event of the first image frame; and
    wherein deriving the trajectory for the matched event comprises deriving the trajectory based at least in part on:
        the center of the first event within the first image frame; and
        the center of the probable travel region within the second image frame.

3. The method of claim 1 further comprising responsive to determining that the type of a first event of the first image frame is a single cell type, and that the type of a second event of the second image frame is an aggregate of multiple cells:
    determining a matched event between the first event in the first frame and the second event in the second frame by:
        calculating an average frame time by dividing a total amount of time of the video file by a number of the image frames in the set of image frames;
        determining an average cell speed based on historic data of cell speed;
        determining a probable travel region for the first event within the second image frame based on:
            the average frame time;
            the average cell speed; and
            the cell dimensions of the first event;
            wherein the probable travel region is an estimate of a location of the second event in the second image frame; and
        matching the first event in the first frame to the second event in the second frame; and
    deriving a trajectory for the matched event based at least in part on:
        the center of the first event within the first image frame; and
        the center of the second event within the second image frame.

4. The method of claim 1 further comprising:
    comparing the trajectory of the matched event to historic data of previous event trajectories to identify a most closely matching trajectory of the previous event trajectories, wherein each of the previous event trajectories is associated with a previous cell property; and
    determining cell properties for the events of the matched event based on the previous cell property associated with the most closely matching trajectory.

5. The method of claim 1 further comprising displaying, by a graphical user interface, the derived trajectory.

6. The method of claim 1, wherein the trajectory of the matched event is further based on the center of an identified event within a third image frame of the video file that is consecutive to the second image frame.

7. The method of claim 1, wherein identifying the events comprises:
    determining, with the processor, the amount of illumination of each of the image frames;
    determining, with the processor, a background baseline illumination for each of the image frames based on an average background baseline illumination;
    determining, with the processor, a respective overall frame illumination for each of the image frames; and
    comparing the background baseline illumination for each of the image frames to the respective overall frame illumination to determine whether one or more events is beyond a predetermined range of the background baseline illumination.

8. A method for tracking cell movement trajectory comprising:

recording, to a plurality of frames with a high-speed camera, a plurality of events within a ridged microfluidic channel over a predetermined amount of time;

identifying, with a processor, a first event of the plurality of events within a first frame of the plurality of frames, a second event of the plurality of events within a second frame of the plurality of frames, and a third event of the plurality of events within a third frame of the plurality of frames, based on each of the events being beyond a predetermined range of a background baseline illumination;

determining, for each of the plurality of events, cell dimensions comprising a center including an x-coordinate and a y-coordinate, a number of pixels, and a radius;

determining, with the processor, a type for each of the plurality of events, wherein the type is a single cell or an aggregate of multiple cells;

responsive to determining matched events between each of the first, second, and third events, and that the type of each of the matched events is a single cell:
deriving a trajectory of the matched events based on the center of the first event within the first frame, the center of the second event within the second frame, and the center of the third event within the third frame; and
displaying, by a graphical user interface, the trajectory of the matched events;

responsive to determining a match between each of the first, second, and third events, and that the type of each of the matched is a single cell:
deriving a trajectory of the matched events based on the center of the first event within the first frame, the center of the second event within the second frame, and the center of the third event within the third frame; and
displaying, by a graphical user interface, the trajectory of the matched events;

responsive to determining that the type of the first event is an aggregate of multiple cells, and that the type of the second event is a single cell, segmenting the first event; and responsive to determining that the type of the first event is a single cell, and that the type of the second event is an aggregate of multiple cells, matching the first event to the second event.

9. The method of claim 8 further comprising:
comparing the trajectory of the matched events to historic data of previous event trajectories to identify a most closely matching trajectory of the previous event trajectories, wherein each of the previous event trajectories is associated with a previous cell property; and
determining cell properties for the matched events based on the previous cell property associated with the most closely matching trajectory.

10. The method of claim 9, wherein the cell properties comprise at least one of:
elasticity, viscosity, stiffness, or adhesion.

11. The method of claim 8, wherein the high-speed camera records at least 800 frames per second and has a resolution of at least 640 by 840 pixels.

12. The method of claim 8, wherein segmenting the first event comprises:
calculating an average frame time by dividing the predetermined amount of time by a number of the plurality frames;
receiving, with a transceiver, historic data comprising previous event trajectories, previous cell properties, previous cell speeds, and previous number of pixels;
determining an average cell speed based on the previous cell speeds;
determining a probable travel region for the first event within the second frame based on:
the average frame time;
the average cell speed; and
the cell dimensions of the first event;
wherein the probable travel region is an estimate of a location of the second event in the second frame;
identifying a plurality of single cells of the second event based on the probable travel region;
matching each of the plurality of single cells in the second frame to the first event of the first frame;
deriving a trajectory of the matched events based at least in part on the center of the first event within the first frame and the center of the second event within the second frame; and
displaying, by a graphical user interface, the trajectory of the matched events.

13. The method of claim 12 further comprising:
comparing, by the processor, the second frame to the third frame to determine a partial match; and
matching, by the processor, the plurality of events in the second frame to the plurality of events in the third frame;
wherein deriving the trajectory of the matched events is further based on the center of the third event within the third frame.

14. The method of claim 8, wherein matching the first event to the second event comprises:
calculating an average frame time by dividing the predetermined amount of time by a number of the plurality frames;
receiving, with a transceiver, historic data comprising previous event trajectories, previous cell properties, previous cell speeds, and previous number of pixels;
determining an average cell speed based on the previous cell speeds;
determining a probable travel region for the first event within the second frame based on:
the average frame time;
the average cell speed; and
the cell dimensions of the first event;
wherein the probable travel region is an estimate of a location of the second event in the second frame;
matching the first event in the first frame to the second event in the second frame;
deriving a trajectory of the matched events based at least in part on the center of the first event within the first frame and the center of the second event within the second frame; and
displaying, by a graphical user interface, the trajectory of the matched events.

15. The method of claim 14 further comprising:
comparing, by the processor, the second frame to the third frame to determine a partial match; and
matching, by the processor, the plurality of events in the second frame to the plurality of events in the third frame;
wherein deriving the trajectory of the matched events is further based on the center of the third event within the third frame.

16. A system for tracking cell movement trajectory comprising:

a graphical user interface (GUI);
one or more processors; and
a memory in communication with the GUI and the one or more processors, storing instructions, that when executed, cause the system to:
  analyze, with the one or more processors, a video file comprising a set of image frames, wherein each of the image frames comprises an amount of illumination;
  identify, with the one or more processors, one or more events in at least two consecutive image frames of the set of image frames, wherein each of the events has a type, being a single cell or an aggregate of multiple cells;
  determine for each of the events, with the one or more processors, cell dimensions comprising a center including an x-coordinate and a y-coordinate, a number of pixels, and a radius;
  determine, with the one or more processors, a matched event across at least two consecutive image frames of the set of image frames, where an event in a first image frame of consecutive image frames is matched with an event in a second image frame of the consecutive image frames, and wherein the determined match is based on the cell dimensions;
  derive, with the one or more processors, a trajectory for the matched event, based on the x- and y-coordinates of the matched event that corresponds to the same cell in the consecutive image frames; and
  display, by the GUI, the trajectory of the matched event.

17. A system for tracking cell movement trajectory comprising:
a graphical user interface (GUI);
one or more processors;
a microfluidic device; and
a memory in communication with the GUI, the one or more processors, and the microfluidic device, storing instructions, that when executed, cause the system to:
  analyze, with the one or more processors, a video file comprising a plurality of frames of a plurality of events within a microfluidic channel of the microfluidic device over a predetermined amount of time
  identify, with the one or more processors, a first event of the plurality of events within a first frame of the plurality of frames, a second event of the plurality of events within a second frame of the plurality of frames, and a third event of the plurality of events within a third frame of the plurality of frames, based on each of the events being beyond a predetermined range of a background baseline illumination;
  determine for each of the plurality of events, with the one or more processors, cell dimensions comprising a center including an x-coordinate and a y-coordinate, a number of pixels, and a radius;
  determine, with the one or more processors, a type for each of the plurality of events, wherein the type is a single cell or an aggregate of multiple cells;
  responsive to determining, with the one or more processors, matched events between each of the first, second, and third events, and that the type of each of the matched events is a single cell:
    derive, with the one or more processors, a trajectory of the matched events based on the center of the first event within the first frame, the center of the second event within the second frame, and the center of the third event within the third frame; and
    display, by the GUI, the trajectory of the matched events;
  responsive to determining, with the one or more processors, a match between each of the first, second, and third events, and that the type of each of the matched is a single cell:
    derive, with the one or more processors, a trajectory of the matched events based on the center of the first event within the first frame, the center of the second event within the second frame, and the center of the third event within the third frame; and
    display, by the GUI, the trajectory of the matched events;
  responsive to determining, with the one or more processors, that the type of the first event is an aggregate of multiple cells, and that the type of the second event is a single cell, segmenting the first event; and
  responsive to determining, with the one or more processors, that the type of the first event is a single cell, and that the type of the second event is an aggregate of multiple cells, matching the first event to the second event.

* * * * *